United States Patent
McCorkendale et al.

(10) Patent No.: US 7,555,551 B1
(45) Date of Patent: *Jun. 30, 2009

(54) AUTOMATIC CONTROLLABLE DEPLOYMENT OF SOFTWARE UPDATES

(75) Inventors: Bruce McCorkendale, Manhattan Beach, CA (US); William E. Sobel, Stevenson Ranch, CA (US)

(73) Assignee: Symantec Corporation, Mountain View, CA (US)

( * ) Notice: Subject to any disclaimer, the term of this patent is extended or adjusted under 35 U.S.C. 154(b) by 665 days.

This patent is subject to a terminal disclaimer.

(21) Appl. No.: 11/216,438

(22) Filed: Aug. 30, 2005

Related U.S. Application Data

(63) Continuation-in-part of application No. 11/106,194, filed on Apr. 13, 2005, now Pat. No. 7,334,005.

(51) Int. Cl.
*G06F 15/173* (2006.01)
*G06F 15/16* (2006.01)

(52) U.S. Cl. ............ 709/225; 709/226; 709/230; 709/231; 709/232; 709/238; 709/239; 709/240; 709/241; 709/242; 709/243; 709/244; 709/245; 709/248

(58) Field of Classification Search ............ 709/225
See application file for complete search history.

(56) References Cited

U.S. PATENT DOCUMENTS

| | | | | |
|---|---|---|---|---|
| 6,073,123 | A * | 6/2000 | Staley | 705/58 |
| 6,484,262 | B1 * | 11/2002 | Herzi | 726/34 |
| 7,181,370 | B2 * | 2/2007 | Furem et al. | 702/188 |
| 7,181,512 | B1 | 2/2007 | Lesher et al. | |
| 2003/0066065 | A1 | 4/2003 | Larkin | |
| 2004/0019889 | A1 | 1/2004 | Melchione et al. | |
| 2004/0060044 | A1 | 3/2004 | Das et al. | |
| 2005/0120040 | A1 * | 6/2005 | Williams et al. | 707/102 |
| 2006/0075001 | A1 | 4/2006 | Canning et al. | |

OTHER PUBLICATIONS

"Dish Network Receiver Software Versions", Echostar Knowledge Base [online] Jul. 25, 2002 [Retrieved on Jul. 7, 2005] Retrieved from the Internet: <URL: http://web.archive.org/web/20041016185847/http://ekb.dbstalk.com/295>. 3 pages.

(Continued)

*Primary Examiner*—Kenny S Lin
*Assistant Examiner*—Tariq S Najee-Ullah
(74) *Attorney, Agent, or Firm*—Fenwick & West LLP

(57) ABSTRACT

Risk of inadvertent introduction of software bugs to a large number of users during a software update is minimized using an automatic mechanism controlling update release. A value-generating module generates a value for a computer, the value falling within a population range of values. A specification module receives update information in an update deployment specification. The information specifies an eligibility window during which a specified portion of the population range is eligible to retrieve an update. The specification can include fields, such as a code selector, a value offset, a start time, etc. An eligibility determination module applies rules to automatically determine eligibility of the computer to retrieve the software update. The computer is determined eligible when the value for the computer falls within the specified portion of the population range for the eligibility window. An update module permits the computer to retrieve the software update based on the eligibility determination.

29 Claims, 9 Drawing Sheets

OTHER PUBLICATIONS

"Frequently Asked Questions about Updating Your Computer", Microsoft.com [online] Aug. 25, 2004 [Retrieved on Jul. 7, 2005] Retrieved from the Internet: <URL: http://web.archive.org/web/20041009194056/www.microsoft.com/a...>. 5 pages.

* cited by examiner

AUTOMATIC CONTROLLABLE DEPLOYMENT OF SOFTWARE UPDATES

CROSS-REFERENCE TO RELATED APPLICATIONS

This application is a continuation-in-part of U.S. patent application Ser. No. 11/106,194, filed on Apr. 13, 2005, now U.S. Pat. No. 7,334,005 entitled "Controllable Deployment of Software Updates," the entire disclosure of which is hereby incorporated by reference herein in its entirety for all purposes.

BACKGROUND OF THE INVENTION

1. Field of the Invention

This invention pertains in general to computer software update deployment, and more specifically to techniques for controlled release of software updates to random subsets of seed users over time.

2. Description of the Related Art

Deploying a software update to a large number of users at a time can pose numerous problems since such updates sometimes introduce software bugs or cause other problems when released to the public, even after the updates have undergone substantial testing to avoid such problems. Regardless of how thoroughly the software update is tested before release to the public, when targeting a large number of disparate machines to receive a software update, it is difficult to guarantee that none of the machines will have a problem with the new software. Thus, when sincere attempts at providing bug-free software updates to the public fails, it is helpful to have some sort of mechanism to mitigate the effects of the problems as quickly as possible.

Software companies have attempted to deal with this problem by limiting the initial release of a new software update to only a subset of all possible users. If a software update is released to only 10,000 machines in a first round of release rather than to the entire pool of millions of users, it is much easier to deal with any problems or bugs introduced by the software that may not have been discovered during prior testing of the software. The users who are affected by the problem are much fewer and more manageable in this type of limited initial release.

There are a number of different ways in which this type of limited software update deployment has been performed. One method involves limiting the initial release only to users in a particular target country or some other defined subset of users. For example, all users in Denmark for a particular software application that is being updated will receive the update first and can report any problems with the software before it is released to the general public. However, this manual release method has caused problems in the past when, for example, a particular bug only manifested itself in the target country and nowhere else. Thus, in those instances, the testing of the product by the seed users in the target country was not representative of the entire population of users of the software application to whom the update would ultimately be deployed.

Another method for limiting update release includes the timed posting and removal of updates. For example, the software update can be made available to the general public at 2 a.m. for a couple of hours, and then the update can be removed. The goal of this method is to permit a subset of users to have a chance to download the update during this two-hour window, and those users can report problems with the software update before it is released more generally to the public. The company distributing the software can monitor for bug reports and reports of system crashes to determine whether the update is ready to be provided to a broader group of users. This manual release method, however, is still not very useful because there are no statistics tied into the update release, and there is no way to know who the seed users are or whether the coverage of the seed user base is adequate for testing the software before a much wider release.

None of the above manual methods of release provide a sufficient amount of control over the software update deployment. However, control is particularly important in situations where software updates have to be released on a very short time frame, since the patch may be needed to resolve a current issue that users are facing with the software. If the software update has to be released within a week, there is very little time to run an actual beta test cycle for the update. For example, the posting and removal of software at 2 a.m. may have to be repeated numerous times over a few days to get enough downloads to form a significant enough seed user base. However, for a critical software update for which time is of the essence, there may not be time to develop a representative base since there may not be time for numerous postings and removals. Even if this critical software update is thoroughly tested before its initial release, there is still a possibility that a problem could arise upon release to the public. It would be best to contain any potential problems within a limited subset of users, but the rapid deployment and time critical nature of software updates can exacerbate this problem.

Therefore, there is a need in the art for a method that allows a more rapid and more uniform mechanism of systematically sending out software updates to a defined and random proportion of seed users before the mass distribution of the update, allowing software updates to be controlled to a much more granular level. Additionally, what is needed is the ability to specify software update distributions so that, for given periods of time, specified portions of the user population are automatically allowed to receive an update.

BRIEF SUMMARY OF THE INVENTION

The above need is met by controlling software updates using a uniform mechanism of sending updates to seed users. A value-generating module generates a value for a computer, the value falling within a population range of possible values. A sampling range-generating module generates a sampling range of values as a proper subset of the population range, the probability of the value falling within the sampling range being predetermined. An eligibility determination module determines whether the computer is eligible to receive a software update, the computer being determined eligible when the value for the computer falls within the sampling range, and an update module provides the software update to the computer based on the eligibility determination. In some embodiments, a problem review module determines whether the software update has caused a problem for computers receiving the update. In response to a determination by the problem review module that the software update has not caused substantial problems for the computers receiving the update, the sampling range-generating module broadens the initial sampling range and software updates are provided to computers with values falling within the adjusted range.

In addition, the above need is further met by an automatic mechanism for controlling release of software updates to avoid the risk of inadvertent introduction of software bugs to a large number of users during a software update release. A value-generating module generates a value for a computer, the value falling within a population range of values. A specification module receives update information in an update deployment specification. The information specifies an eligibility window during which a specified portion of the population range is eligible to retrieve an update. The specification can include fields, such as a code selector field, a value offset field, an update start time field, a time window field, and an incremental percentage field. An eligibility determination module applies rules to automatically determine eligibility of the computer to retrieve the software update. The computer is determined eligible when the value for the computer falls within the specified portion of the population range for the eligibility window. An update module permits the computer to retrieve the software update based on the eligibility determination.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1:
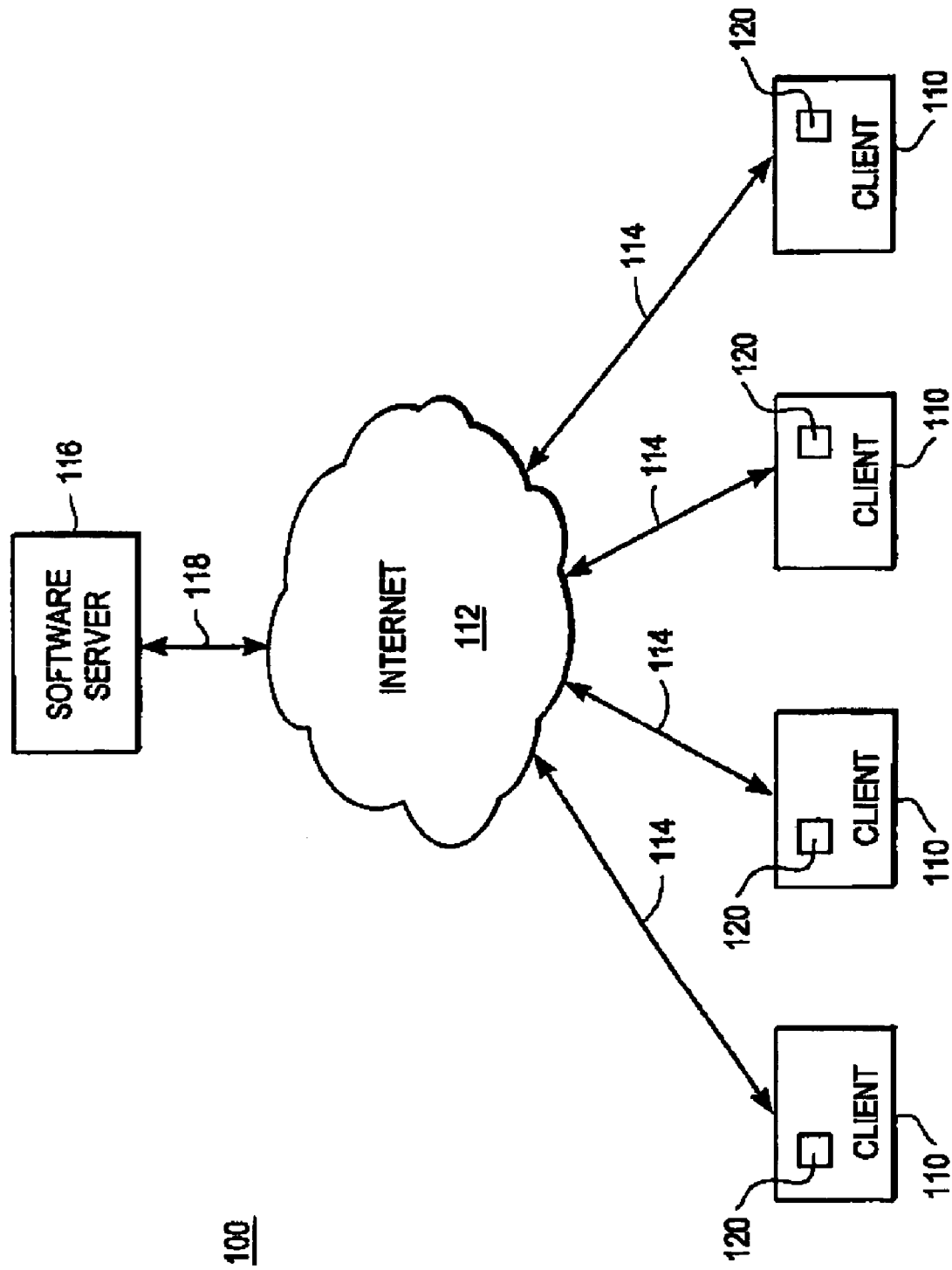
FIG. 1 is a high-level block diagram illustrating an example of a standard computing environment 100, according to one embodiment of the present invention.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

The update deployment module disclosed herein allows a more uniform mechanism of systematically sending out software updates to a random portion of users before the general distribution of the update to the public, allowing much more control over software updates. Upon success of the distribution of the software to the first group of seed users, the update deployment module can increase the range of the seed users, possibly by an order of magnitude, and the module can continue this increasing of the number of seed users until some predetermined number of users has received the update. As used herein, a "software update," or an "update" or "patch," can include an upgrade to a newer version of a particular software application or module or a version with new functionality, alteration of configuration parameters, a virus definition (or other malicious code definition), addition of an executable module (e.g., a new user feature, an alteration of the operating system or other installed application), and any other content update (e.g., including content updates in which the content may be firewall rules, antivirus definitions, antispam definitions, URL block lists, etc.).

In another embodiment of the present invention, the update deployment module automatically manages the rollout of a software update over time, and thus reduces the amount of manual administration required in sending out updates in a controlled fashion. This embodiment allows an administrator to set the parameters a single time for the controlled software update rollout in an update deployment specification. The update deployment module then automatically sends the software update out to subsets of users over time, according to the parameters specified. Thus, the administrator would not have to be responsible for tracking the users and for calculating the size of the update base to be targeted with sending of an update, nor would the administrator repeatedly have to intervene to adjust the rate of the rollout distribution. Furthermore, the administrator would only need to update the specification once, and then the rollout would occur without further manual adjustment (unless the rollout needs to be ended or adjusted due to a problem with the update or update rollout). In some embodiments, the administrator specifies an update deployment specification or an update rollout distribution envelope by specifying incremental percentages of software update install instances for a given period of time that should be added to the set of instances already allowed to receive an update. In this manner, the automatic and controlled update deployment can be set to proceed.

FIG. 1 is a high-level block diagram illustrating a computing environment 100 according to an embodiment of the present invention. Multiple client computers 110 are in communication with the Internet 112 or other network, such as a local area network, via communications links 114. Although only four client computers 110 are shown in FIG. 1, there can be thousands or even millions of computer systems coupled to the Internet 112, according to embodiments of the present invention. In one embodiment, the client computers 110 are conventional computer systems. In other embodiments, one or more of the client computers 110 are different electronic devices having connectivity to remote update sources, such as cellular telephones, personal digital assistants (PDAs), etc. A server 116 is also connected to the Internet 112 via a communications link 118.

Figure 2:
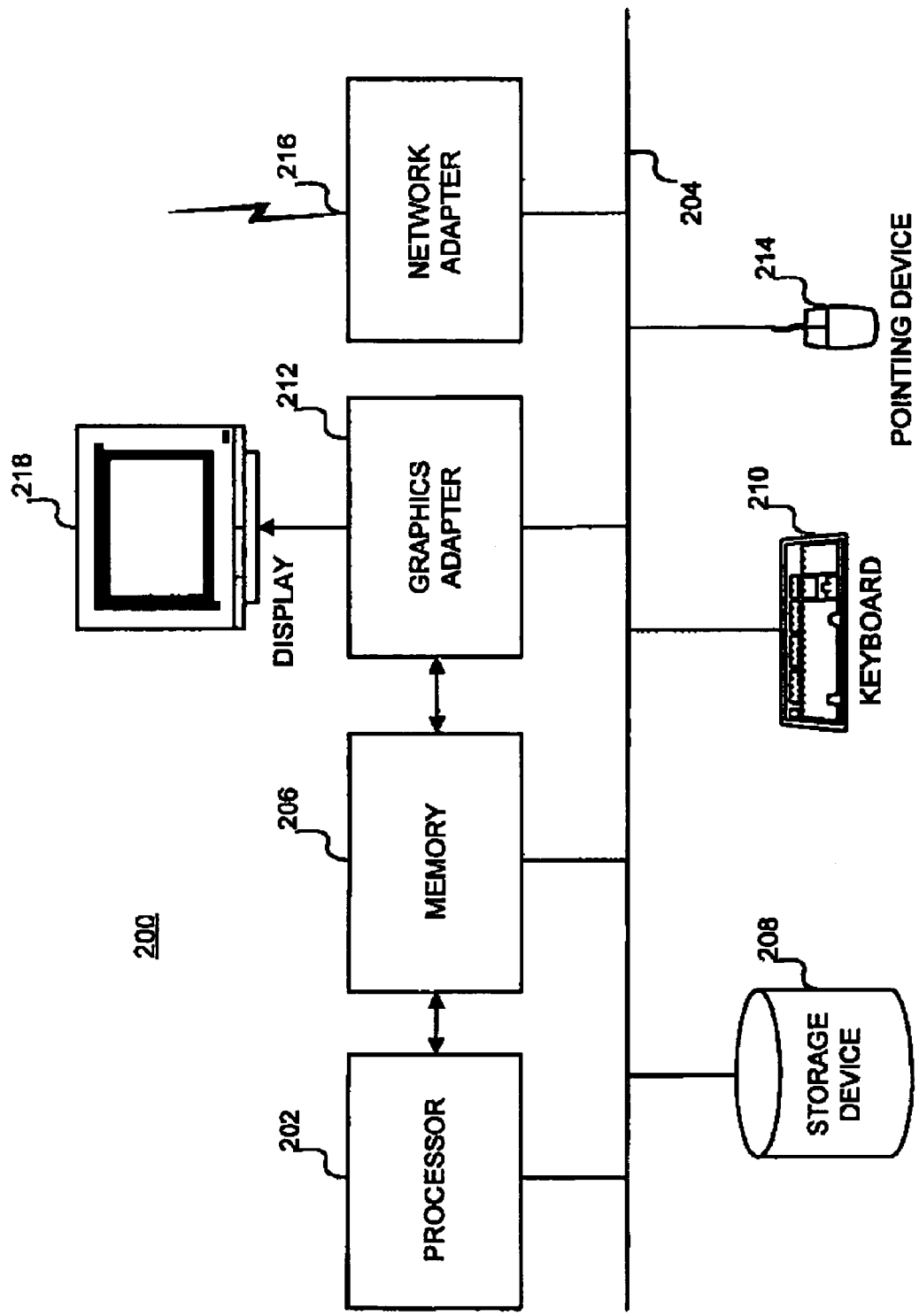
FIG. 2 is a high-level block diagram illustrating a standard computer system 200 for use with the present invention.

As is known in the art, the client computers 110 preferably execute an operating system and one or more application programs. As used herein, the term "application" or "software application" can include any type of software or program, a component of a program, a service, an object, a distributed object, or a collection of one or more of these. As used herein, the term "computer" or "client computer" or "client" can include a standard computer system, as illustrated in FIG. 2, and the computer can also have multiple effective computers running on a single piece of hardware (i.e., running under virtual machines, such as using Vmware®, IBM z/series 900 server, etc.), or multiple copies of the same product running under different user accounts or under the same user account, or have a single copy of software installed on the same computer with different profiles (i.e., what version of the software is accessed can depend on the profile), etc. The operating system controls the operation of the computer system, and some examples of such an operating system include LINUX®, or PALM OS, or one of the versions of MICROSOFT WINDOWS®.

In FIG. 1, each client computer 110 is connected to the Internet via a communications link 114. Preferably, the communications link 114 utilizes conventional networking technology. For example, in one embodiment a client computer 110 uses a modem to connect over standard telephone lines with an Internet Service Provider (ISP) having a high-speed connection to the Internet 112. In another embodiment, a client computer 110 uses a digital subscriber line (DSL) or cable modem to access the ISP via a telephone line or cable television line, respectively. In yet another embodiment, the client computer 110 uses a network card and Ethernet connection to directly connect to the Internet 112. In still other embodiments, the communications link 114 connects the client computer 110 via a wireless 802.11, Bluetooth, or mobile phone (e.g., CDMA or GSM) network. Thus, many different types of technology can be used to provide the functionality of the communications link 114.

As known in the art, the Internet is a large, publicly-accessible network of networks. Individual computers and other devices can utilize communications protocols such as the transmission control protocol/Internet protocol (TCP/IP) to send messages to other computers on the Internet. These messages can use protocols such as the hypertext transport protocol (HTTP), file transfer protocol (FTP), simple mail transport protocol (SMTP), post office protocol 3 (POP3), and Internet message access protocol (IMAP), and data representations such as the hypertext markup language (HTML) and extensible markup language (XML) to carry and exchange information. Embodiments of the present invention may use other communications protocols and languages to exchange data.

Another communications link 118 connects the server 116 to the Internet 112. The server 116 can send information, such as software updates or patches, across the Internet 112 and to the client computers 110. Additionally, the client computers 110 can make determinations (e.g., interpret an update deployment specification or rollout distribution envelope and make a determination regarding whether or not the client computer's value (e.g., a random value) or update identification number is eligible to retrieve the software update). The client computers 110 can also can send out information (i.e., providing values that can be randomly generated to the server 116 for controlled update deployment) or make requests across the Internet 112 to the server 116, such as general requests for software updates or requests for updates for a particular software application. The communications link 118 is generally the same as the communications links 114 connecting the client computers 110 to the Internet 112. Although only one server 116 and associated communications link 118 are shown in FIG. 1, embodiments of the present invention may have multiple servers and/or links. The server 116 may be a conventional computer system or a network of systems.

In the embodiment illustrated in FIG. 1, each client computer 110 executes an update deployment module 120 for controlling software update deployment for the client computer 110. The update deployment module 120 can be a discrete application program, or the module 120 can be integrated into another application program or the client computer's 110 operating system. In some embodiments, all or a portion of the update deployment module 120 is executed on the server 116. Thus, the server 116 controls which software updates are sent out and which computers will receive the updates. For example, the module 120 might include two different programs, one running on the server 116 and one running on the client 110. The program running on the server 116 can set up parameters for determining which clients 110 will receive an update, and the program running on the clients 110 can generate a value that may or may not fall within the parameters set by the server 116. In some embodiments, the server 116 acts as a dumb file server that provides sufficient information to the client 110 so the client can interpret an update deployment specification or rollout distribution envelop and make a determination regarding whether or not the client computer's update identification number is eligible to retrieve the software update. In some embodiments, the server 116 sends the software update to the clients 110 that fall within the established parameters, which will be a subset of all of the users who will eventually receive the update. Thus, both the client computers 110 and the server 116 can be involved in creating a controlled environment for update receipt or release.

FIG. 2 is a high-level block diagram illustrating a functional view of a typical computer system 200 for storing and executing the compatibility module 120, according to one embodiment of the present invention. This computer system 200 can act as a client computer 110, as shown in FIG. 1. However, one or more of the components of the computer system 200 may be missing or modified in the client computer 110. Illustrated is a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU, or the processor 202 may also be a custom-built processor. The memory 206 may be, for example, firmware, read-only memory (ROM), non-volatile random access memory (NVRAM), and/or RAM, and holds instructions and data used by the processor 202. The storage device 208 is, in one embodiment, a hard disk drive but can also be any other device capable of storing data, such as a writeable compact disk (CD) or DVD, and/or a solid-state memory device. The pointing device 214 may be a mouse, track ball, or other type of pointing device, and is used in combination with the keyboard 210 to input data into the computer system 200. The graphics adapter 212 displays images and other information on the display 218. The network adapter 216 couples the client computer 110 with the Internet 112.

As is known in the art, the computer system 200 is adapted to execute computer program modules for providing functionality described herein. In this description, the term "module" refers to computer program logic for providing the specified functionality. A module can be implemented in hardware, firmware, and/or software. Where the any of the modules described herein are implemented as software, the module can be implemented as a standalone program, but can also be implemented in other ways, for example as part of a larger program, as a plurality of separate programs, or as one or more statically or dynamically linked libraries. It will be understood that the modules described herein represent one embodiment of the present invention. Certain embodiments may include other modules. In addition, the embodiments may lack modules described herein and/or distribute the described functionality among the modules in a different manner. Additionally, the functionalities attributed to more than one module can be incorporated into a single module. In one embodiment of the present invention, the modules form a computer program product and are stored on a computer-readable storage medium such as the storage device 208, loaded into the memory 206, and executed by the processor 202. Alternatively, hardware or software modules may be stored elsewhere within the computer system 200.

Figure 3:
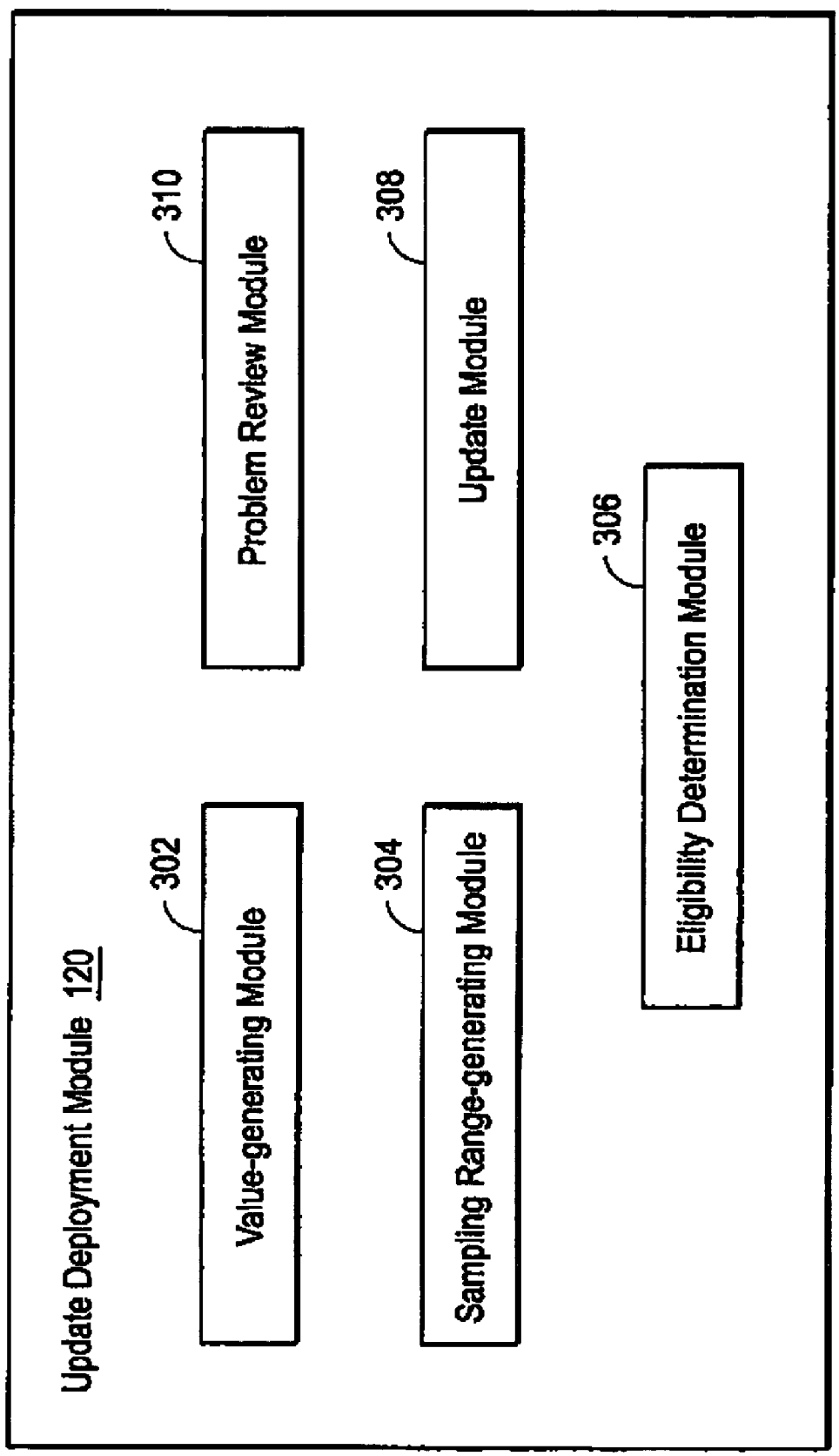
FIG. 3 is a high-level block diagram illustrating the functional modules within the update deployment module 120, according to one embodiment of the present invention.

FIG. 3 is a high-level block diagram illustrating the functional modules within the update deployment module 120, according to one embodiment of the present invention. The update deployment module 120, in the embodiment illustrated in FIG. 3, includes a value-generating module 302, a sampling range-generating module 304, an eligibility determination module 306, an update module 308, and a problem review module 310. Any or all of these modules can be included on a client computer 110, on a server 116, or both.

The value-generating module 302 generates a value that can be a random value for a client computer 110, the value falling within a population range of possible values. One of ordinary skill in the art will recognize that the generation of a "random value" or "random number" can be influenced by a deterministic or known component. For example, the random value generated could be affected by a user's preference settings for risk tolerance or some other type of bias toward generating one number over another, and yet the number generated is still random. In some embodiments, the random value is automatically generated at the time of installation of the value-generating module 302 on a client computer 110. In other embodiments, the value is generated when a server 116 requests this data from a client computer 110. The value can also be generated any time in between the installation and the request. Furthermore, the value can be generated when a client computer 110 first requests a software update from the server 116 or notifies the server 116 that an update is needed.

The random value generated will typically be maintained for the client computer 110, and thus the value continues to exist and is used for a number of different software updates. However, the value-generating module 302 generates a new number for a computer 110 when necessary or desired. For example, a new number can be generated during a user migration to a new machine, after reinstallation of the software, after system failure, or as a debugging mechanism. In some embodiments, the value can change each time a successful update occurs for security reasons.

The random values are preferably non-unique values, and the update deployment process functions most effectively when the values generated are non-unique random values. The values can be non-unique since the invention does not require that every computer 110 or user be tracked (i.e., it is not necessary to track every unknown), as might be necessary in a system that uses unique ID numbers to prevent piracy by tracking each piece of software that is sent out or by keeping track of every subscriber for the software and limiting who can receive updates based on subscriptions.

Typically, the value-generating module 302 generates the random value from a uniform distribution, thus ensuring that a straight uniform sampling of client computers 110 receives the update regardless of the country they live in, the language, the location, the time of day, etc. In this manner, a random subset of all users of the client computers 110 is tested. However, the value can also be generated from other distributions, such as a bell curve distribution, a Poisson distribution, an empirically-defined distribution, and the like.

A multidimensional number could also be generated. Instead of having a single number, a computer 110 can generate a few numbers. For example, the computer 110 can have a number based on the country in which it is located, a number based on the risk tolerance of the user (i.e., certain users may have a high risk tolerance and may be more interested in receiving the most current software updates without delay, and certain users may have an especially low risk tolerance and may only wish to receive the update after it has been well tested by other users), and a number based on some other identifying characteristic. A particular update can thus be set to be tested by users in a 1 to 10 range for risk tolerance, a 1 to 3 range for country, and a 1 to 50 range for some other characteristic, thereby testing different percentages of the users with different defined characteristics.

As stated above, the random value generated falls within a population range of possible values. This population range can be any range from $N_1$ to $N_2$, where each N can be for example a 32-bit number, N can be −1, 0, 1, 1000, 1 million, etc., or N can be any machine-representable number, bounded or unbounded. The population range spans the set of values for all users to whom the update will probably ultimately be sent after the testing has been completed. The random values generated by computers 110 to receive the update will fall within the population range.

The sampling range-generating module 304 generates a sampling range of values as a proper subset of the population range, the probability of the value falling within the sampling range being predetermined. The sampling range defines the subset of users who will test the product by defining a range in which the values generated by some of the clients 110 will fall. As described above, the random values generated by the clients 110 will fall within the population range, and the population range spans the set of values for all users to whom the update will probably ultimately be sent after the testing has been completed. Thus, the sampling range generated by the sampling range-generating module 304 is a subset of the population range, and the sampling range defines the subset of values that will be involved in the testing (i.e., the clients 110 with values falling within the sampling range that will test the software update). For example, if the population range is 1 to 1 million, and the update is to be sent out to all users, the sampling range would also be set to be 1 to 1 million. If the population range is 1 to 100 and the sampling range is 1 to 5, clients 110 with values falling within that sampling range (e.g., a value of 4) will receive the software update.

The sampling range can also be discontinuous. For example, the range can run from 1 to 10 and from 21 to 100. This might be useful in a situation where certain users have especially low risk tolerances and do not wish to participate in the testing procedure. Users generating numbers falling within 11 to 20 can be set to receive the update last, after it has been tested by many other users.

The sampling range can be specified in a file that is associated with the software update package to be deployed (e.g., bundled with the software update package or linked with an URL, reference, or pointer to the package). The sampling range can also stored on the client computer 110 or on a server 116 (e.g., in a central location such as a relational database, a registry, or a repository directory).

The sampling range-generating module 304 not only generates the initial range of seed users, but also can generate successively broader sampling ranges (within the population range) as the update testing progresses. For example, if the population range is from 1 to 1000, the sampling range-generating module 304 can initially generate a range of from 1 to 10. This range can be set with the goal of controlling the initial deployment of the update so that 1% of the population of users with random values within the population range will receive the update in the first round. Once deployment has occurred for a period of time and significant problems have not been reported, the module 304 can generate a second broader range to encompass a larger number of target users. For example, the second range might be from 1 to 100, thus rolling out the update to 10% of the users to whom the patch applies in this second round of release. This broadening of the range can continue until the update has been provided to all users to whom the patch applies. Thus, all or most computers 110 with random values within the population range of 1 to 1000 will receive the update. If there are problems at any point during the roll out of the update, the roll out can be stopped while the problem is being resolved. However, any problems encountered should only affect the initial sets of seed users rather than the entire population of users, thus permitting much easier control of damage caused due to problems with the update.

In some embodiments, the starting sampling range will vary as different software updates are released. For example, if the initial sampling range is 1 to 10 for one software update, the initial sampling range can be set to be 11 to 20 for the next software update. In this manner, the first set of seed users who are most likely to be affected by problems with the updates will vary from one update release to another.

In some embodiments, the value-generating module 302 can also generate random values according to an unknown or unexpected distribution. For example, computers and software have been known in the past to have biases, sometimes unexpected, in their random number generators. These biases can result in the generation of random values that are either not truly random or that do not conform to the anticipated distribution, e.g., a uniform, normal, or other distribution. In some embodiments, the sampling generator can set the window according to any known distribution such that the probability of any given value generated will have the desired probability of falling within the window. Additionally, the range can be set based on an empirically-determined frequency of values generated, for example by estimating the empirical distribution for the numbers tested over a window in time such that it will more accurately reflect the true distribution of the sample values that are received. The sampling range-generating module 304 can adjust the size of window based on known patterns or rates of requests for updates. After setting a range, the sampling range-generating module 304 can collect information regarding how many people actually test the update (e.g., it can keep track of the number of downloads), and so the module 304 can build statistical data as it is in operation to determine if oversampling or undersampling is occurring. Therefore, it does not necessarily matter what values are generated or according to what distribution since the sampling range generator can adjust for this.

The eligibility determination module 306 determines whether the computer 110 is eligible to receive a software update. The computer 110 is determined to be eligible when the random value for the computer 110 falls within the sampling range. Thus, the eligibility determination module 306 determines whether or not the value for each computer 110 falls within the sampling range. In some embodiments, the module 306 first determines whether there is a sampling range set for a particular update, and if so, what the range is. The eligibility determination module 306 can make its determination each time software updates are available by asking each client computer 110 for its random value, and then checking to see if the value falls within the sampling range. In some embodiments, the eligibility determination module 306 responds to requests by a client computer 110 for an update, and the module 306 asks the computer 100 for its generated value or the computer 110 automatically provides the value when seeking an update.

In some embodiments, the eligibility determination module 306 runs on a server 116 and, thus the server 116 can determine whether or not a client computer 110 should receive an update. Alternatively, the module 306 can run on the client computers 110, and each client 110 can determine if it is eligible for receiving a patch (and can refuse the patch if it is not eligible).

The update module 308 provides the software update to the computer 110 based on the eligibility determination. In some embodiments, after receiving notification from the eligibility determination module 306 that a computer 110 is eligible to receive an update, the update module 308 will make the update available to the computer 110 so the update can be downloaded by the user. In other embodiments, the update module 308 automatically downloads and installs those changes on the computer 110 if the user has configured the computer 110 to allow these automatic installations.

In some embodiments, the eligibility determination module 306 only finds the computer 110 eligible to receive certain parts of the update. The user may only be permitted to download a particular portion of the update package (i.e., if it is determined that the user is running other software that may conflict with a portion of the update). In the case of automatic updates, the eligibility module can notify the update module 308 of which parts of the update a computer 110 should receive, and the update module 308 automatically downloads and installs those changes.

In some embodiments, the update deployment module 120 also includes a problem review module 310 that determines whether the software update has caused a problem for computers 110 receiving the update. The problem review module 310 can keep track of bug reports or reports of system crashes and determine if these problems are due to the software update being released. If the problem review module 310 detects that there is a problem with the update, the problem review module 310 can temporarily end the update release process while the problem is being remedied. If the problem review module 310 detects no problems, the module 310 can allow the release to continue. In some embodiments, the problem review module 310 runs on a client computer 110 and reports problems to the server 116. The server 116 can use this feedback to adjust update delivery accordingly.

Figure 4:
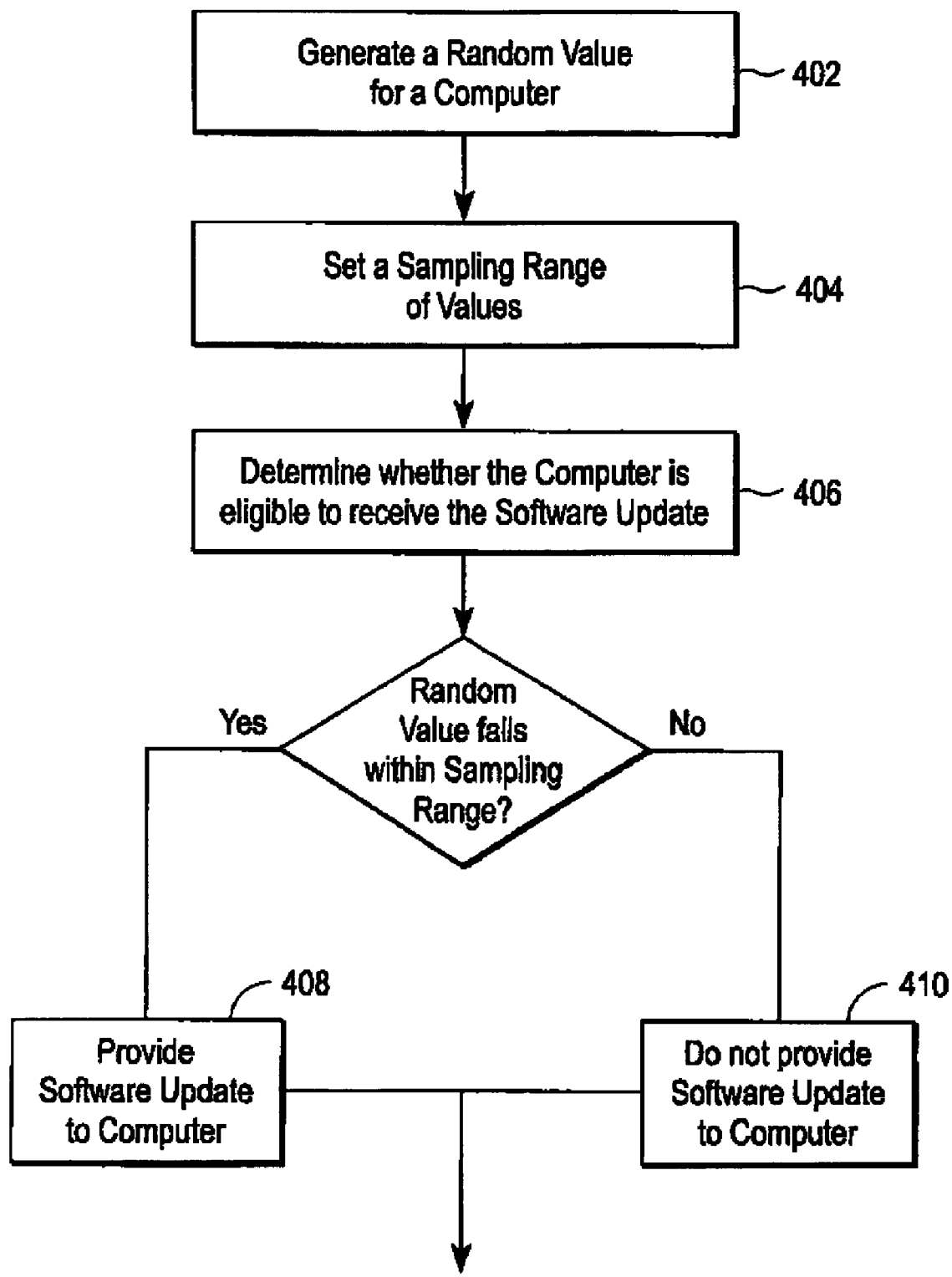
FIG. 4 is a flowchart illustrating steps performed to control the release of software updates, according to one embodiment of the present invention.

Referring now to FIG. 4, there is shown a flowchart illustrating the operation of the update deployment module 120, according to some embodiments of the present invention. It should be understood that these steps are illustrative only. Different embodiments of the update deployment module 120 may perform the illustrated steps in different orders, omit certain steps, and/or perform additional steps not shown in FIG. 4.

As shown in FIG. 4, the update deployment module 120 generates 402 a random value for a computer. Each client computer 110 connected to a server 116 can generate a value, for example. This value generated will fall within a population range, and as described previously, the population range spans the set of values for all clients 110 to whom the update will probably ultimately be sent after the testing has been completed. For example, the population range could be 1 to 1000 (or could be much larger, such as 1 to 1 million). The random value generated is preferably non-unique (e.g., more than one client 110 can generate the same value), and the value will fall within the population range of 1 to 1000. Client A might generate a random value of 5, while client B might generate a random value of 20. These values for clients A and B can be maintained through numerous software updates, and can potentially be maintained until generation of a new number becomes necessary (e.g., system failure or user migration to a new machine).

The update deployment module 120 sets 404 a second range as a subset of the population range described above, and this second range is referred to as the sampling range of values. The sampling range can be chosen according to the proportion of seed users to receive the initial update. The range is also a proper subset of the population range, and the probability of the random value falling within the sampling range can be predetermined. For example, where the population range is 1 to 100, the sampling range might be 1 to 10, and clients 110 that have generated random values falling within the sampling range (e.g., a value of 3) will receive the update.

In some embodiments, a file describing the content of an update package stores the sampling range as a minimum and a maximum range value, and the value generated by a client 110 will have to fall within this range for that client 110 to install the update. For example, the initial testing range of a software update can include a minimum of 1 and a maximum of 10. By selecting this sampling range within the population range, it is possible to control the deployment of this update so that it will be provided to up to 1% of the user base for that software application. This can be a straight, uniform distribution of 1%, regardless of the language, location, or time of day for the release, and this sample will be somewhat representative of the overall population. Thus, a manageable sample of seed users receive the initial release of the software before the software update is released more generally.

The update deployment module 120 determines 406 whether a computer is eligible to receive the software update. The module 120 determines whether or not the value generated by the computer falls within the sampling range. When an update is going to be released, the server 116 can request from each client 110 its value that was generated, or the clients regularly scan for updates and can offer their numbers to the server 116. In some embodiments, the server 116 sends out the updates to all of the clients 110, and the clients 110 determine whether or not their value generated falls within the sampling range, and thus whether or not to accept or refuse the update.

Returning to the previous example, the value of 5 generated by client A falls within the sampling range of 1 to 10, while the value of 20 for client B does not. Module 120 determines 406 that client A is eligible to receive the first release of the software update, while client B is not be eligible. The module 120 thus provides 408 the software update to client A, but does not provide 410 the update to client B. The module 120 can make the update available to the clients 110 eligible to receive the update so the client can then download the update, or the module 120 can even automatically install the update on the client computer 110.

Figure 5:
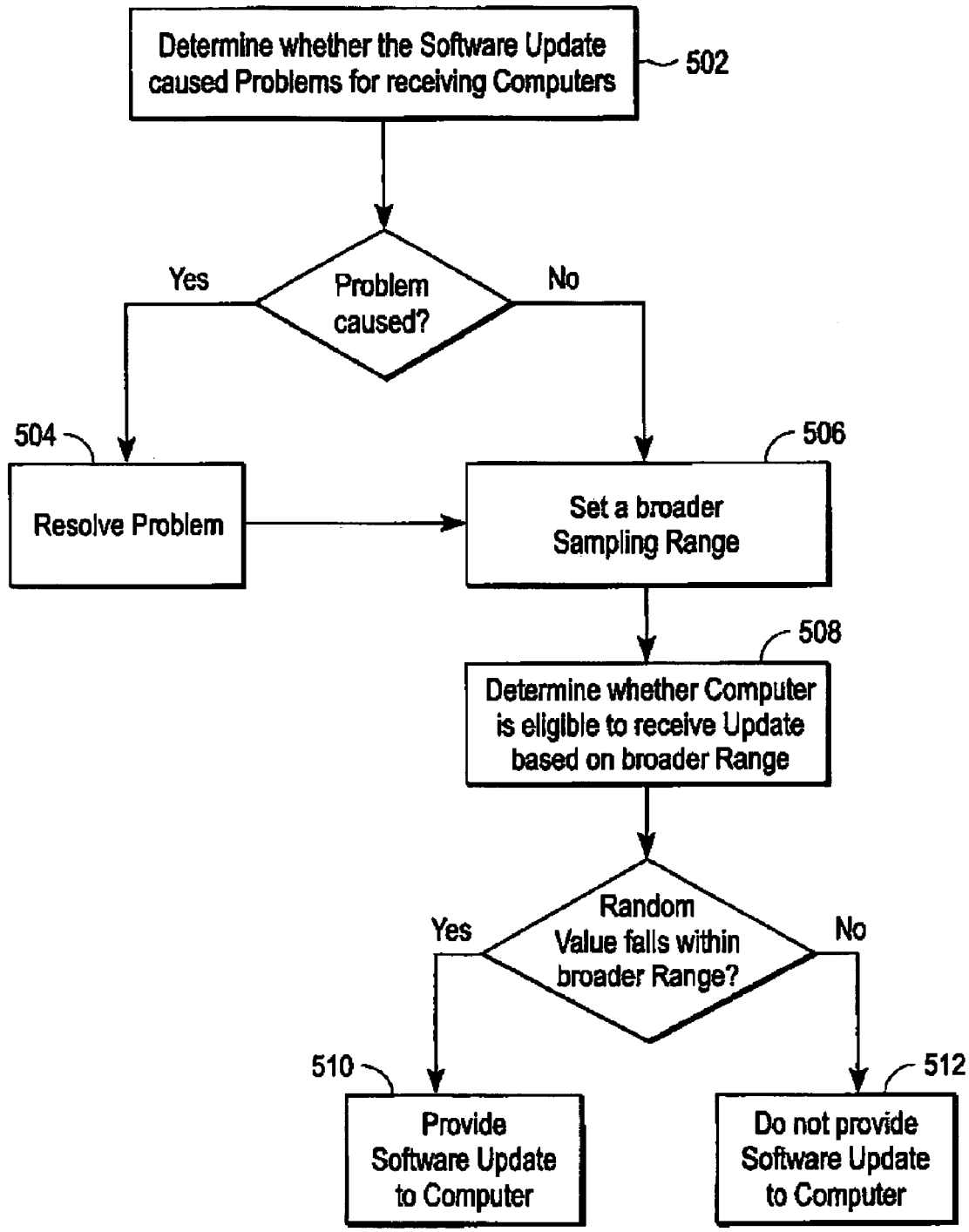
FIG. 5 is a flowchart illustrating steps performed to control the release of software updates where the sampling range is being broadened over time, according to one embodiment of the present invention.

Referring now to FIG. 5, there is shown a continuation of the previous flowchart, according to some embodiments of the present invention. Once the update has been received by the eligible client computers 110, the update deployment module 120 can determine 502 whether the update caused problems for the computers 110 receiving the updates. The module 120 can do this by monitoring for bug reports, by reviewing for crash reports (e.g., using Microsoft® Online Crash Analyzer to determine if crashes are occurring due to the software update), or other similar methods. If a problem occurs, the problem can first be resolved 504 before the software update release process is continued. For example, if it is discovered that the update includes a software bug, the update can be modified by the software company that created the update to remove the bug or otherwise repair the problem. If after a period of time (e.g., a few hours, a few days, a few weeks, etc.) there have not been any problems or not been significant problems, the update deployment module 120 can set 506 a broader sampling range (i.e., broaden the previously set sampling range). The module 120 can do this by updating a file that is associated with the update package and that stores the sampling range. The sampling range can also be stored in some other central location (e.g., a database), and be updated there. Returning to the previous example, the module 120 can adjust the sampling range of 1 to 10 and increase it to 1 to 100. Under this adjusted range, the update can be deployed to a larger user base (i.e., can be rolled out to up to 10% of the users).

The update deployment module 120 can again determine 508 whether each computer is eligible to receive the update based on the broader sampling range. The value of 20 for client B will fall under the broader sampling range of 1 to 100. Thus, the module 120 can provide 510 the update to client B during the second release to seed users, but the module 120 will not provide 512 the update to another client 110 with a value equal to 200, for example. This process can be repeated numerous times, with the sampling range being broadened each time until all (or most) of the users within the population range of 1 to 1000 have received the update (i.e., when the sampling range is broadened to 1 to 1000, all of the users in the population range of 1 to 1000 will receive the update). Alternatively, at some point after enough users have tested the update, the range restriction can be removed to effectively deploy the update to all users. The process can be stopped at any point in which problems are encountered along the way so that the problems can be resolved before they have a chance to affect the entire user base.

In deployment of a second software update, clients A and B can maintain their values of 5 and 20. The sampling range can be generated so that the same starting range of 1 to 10 is not chosen each time, but instead the system is set to generate different range (e.g., 11 to 20). In this manner, the same set of initial seed users is not always put at the greatest risk by being the first users to test a new update.

The software update deployment method including the broadening of the sampling range to encompass more users over time can be done manually or can also be done automatically. In the automatic deployment, the update deployment module 120 can receive details about the desired deployment of a software update, e.g., the "ramp" for deployment over time. The module 120 can be provided with information including what the update is, how long the release should take, what the "ramp up" of the release should look like (i.e., how steep should the ramp be or how quickly should the update be released to more and more users), and the like. The module 120 will automatically generate the numbers to match these parameters. The module can then start each release and automatically generate larger sampling ranges according to the set parameters to automatically release the update to more and more users over time until all users have received the update. For example, the module 120 can automatically make changes over time so that there is an increase in the sampling range by 1% per day over the first week to cover up to 7% of the users and an increase by 2% per day in the second week and then 8% per day after that.

This process can continue automatically until the process is stopped (i.e., if a problem with the software is discovered). Once the problem is resolved, the automatic process can be reinitiated. The parameters can be adjusted to meet the needs for each update. More critical updates, for example, may require very quick release and thus a steep ramp, as opposed to less critical updates that can be released slowly over a longer period of time. As discussed previously, the sampling range can be stored in a file that can be modified as the sampling range is broadened over time. In this manner, an automated, controlled, global deployment of the software update can occur. Another embodiment in which automatic deployment is performed is described in detail below with regard to FIGS. 6, 7, 8, and 9.

Figure 6:
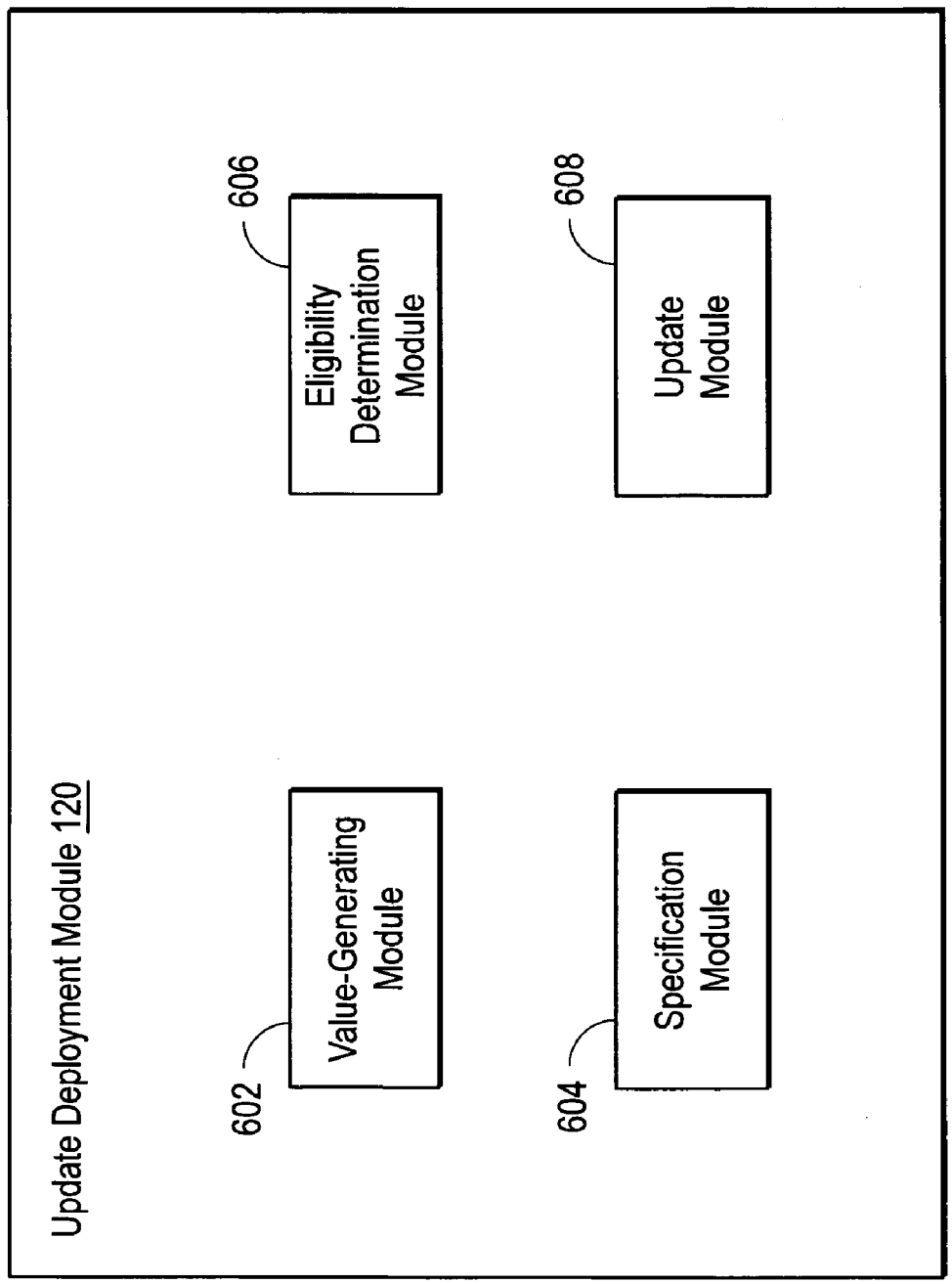
FIG. 6 is a high-level block diagram illustrating the functional modules within the update deployment module 120, according to another embodiment of the present invention.

FIG. 6 is a high-level block diagram illustrating the functional modules within the update deployment module 120, according to another embodiment of the present invention. The update deployment module 120, in the embodiment illustrated in FIG. 6, includes a value-generating module 602, a specification module 604, an eligibility determination module 606, and an update module 608. Any or all of these modules can be included on a client computer 110, on a server 116, or both.

The value-generating module 602 generates a value for a client computer 110, the value falling within a population range of possible values, similar to the embodiments described above. In some embodiments, the value generated is a random value. This random value can act as an update identification number for the computer 110 for use in determining when the computer 110 is eligible to receive a software update. In some embodiments, this value is stored in a file (e.g., an update file) that specifies information about the update.

This value generated or update ID number can be assigned at the software update install time, or the value can be assigned whenever an install instance encounters a reference in a setting (e.g. an update file entry) such that the value is needed but the value is not already present. In some embodiments, the value is automatically generated at the time of installation of the value-generating module 302 on a client computer 110. In other embodiments, the value is generated when a server 116 requests this data from a client computer 110. The value can also be generated any time in between the installation and the request. Furthermore, the value can be generated when a client computer 110 first requests a software update from the server 116 or notifies the server 116 that an update is needed. The value generated will typically be maintained for the client computer 110, and thus the value continues to exist and is used for a number of different software update deployments. However, the value-generating module 602 generates a new number for a computer 110 when necessary or desired. Thus, for example, if the value is deleted for some reason, a new value can be created.

Similar to above-described embodiments, the values generated can be non-unique values, and the update deployment process functions effectively when the values generated are non-unique random values. Typically, the value-generating module 602 generates the value from a uniform distribution, thus ensuring that a straight uniform sampling of client computers 110 receives the update regardless of the country they live in, the language, the location, the time of day, etc. However, the value can also be generated from other distributions (e.g., a bell curve or Poisson distribution). In addition, the module 602 can also generate a multidimensional number (i.e., instead of having a single number, a computer 110 can generate a tuple of numbers).

As stated above, the value generated falls within a population range of possible values. As also stated above, this population range can be any range from $N_1$ to $N_2$, where each N can be for example a 32-bit number, N can be $-1, 0, 1, 1000, 1$ million, etc., or N can be any machine-representable number. The population range acts as an update ID space including all of the update ID's that will be retrieving the update. The population range thus spans the set of values for all users to whom the update will probably ultimately be set after the testing has been completed. The values generated by computers 110 to receive the update will fall within the population range.

The specification module 604 receives update information in an update deployment specification. The update information acts as an update rollout distribution envelope that specifies the parameters that control the automatic deployment of a software update to computers 110. More specifically, the update information specifies an eligibility window during which a specified portion of the population range is eligible to retrieve an update. In some embodiments, the update deployment specification is stored in an update file. An administrator can provide the update information in the update specification by filling in particular fields in the specification.

In some embodiments, the administrator defines the eligibility windows by specifying, in the update deployment specification, portions of the population range of values for computers 110. Computers 110 with values within these specified portions are eligible to retrieve the update. The administrator can also associate each specified portion with a window of time or other type of defined window. In other words, the administrator can specify a number of time windows during which specified portions of the population range become eligible to receive the update. In this manner, the administrator can control the rate of release of a software update to users.

Since the deployment of updates is automatic, the administrator can specify this update information in these fields a single time, thus indicating the desired rollout distribution of the update over time. Once the administrator has set the eligibility windows and any other deployment parameters, the update deployment module 120 will automatically deploy the update according to the parameters set by the administrator. If at some point during the deployment a problem with the update is reported or otherwise discovered (i.e., client computers 110 send reports to a server 116 that the update has caused the computers 110 to crash), the administrator can intervene to stop or postpone the automatic deployment. Once the problem is fixed, the automatic deployment can be adjusted or restarted if desired.

In some embodiments, the rollout of a software update over time is based on a linear slope, as described above. Instead of linear slopes, however, some embodiments use a step function in which the all computers 110 with values falling in the specified portion are immediately allowed to obtain the update at the beginning of each specified window (rather than a gradual introduction over the window duration). Non-linear curves (e.g. exponentials) can also be used to describe the rate at which the specified percentage of computers 110 with particular values are allowed to retrieve the software update during an eligibility window.

One example of the specification module 604 receiving update information in an update specification is described in detail below. In this example, the update deployment specification is composed of a number of fields, including one or more of the following:

1. An optional code selector field
2. A value offset field
3. An update start time field
4. A time window field
5. An incremental percentage field The optional code selector included in this example allows creation of a specification that limits deployment to a particular group of computers 110 (i.e., within a particular region) with values within the population range. An administrator can use the code selector field for specifying a particular region in which automatic deployment of the software update will occur. For example, the code selector can be a country code selector that identifies a geographical region-specific group of computers 110. In this example, a country-specific specification targeting only the United States or some other country can be created. The administrator can choose to deploy the update only to a particular country by selecting this country in the code selector field. In some embodiments, such a region-specific specification is identified using two letter ISO country codes. A specification in which a code selector is not included or where a country code selection was not made can apply to all countries not explicitly specified using a code selector.

Regions defined using the code selector field do not have to be limited by country boundaries, and thus can be tied to more than just geography. For example, the code selector can provide an option to select a corporate designation (e.g., IBM North America or General Motors Information Technology Department), or other types of group designations (e.g., Department of Defense) that may be useful in controlling release of updates to these specific groups. Thus, when stated herein that the code selector can be used to select a particular region in which automatic deployment of the software update will occur, it will be understood that this is not limited to countries or geographical regions, but the phrase can also include other types of group designations.

In the above-described example, the update specification associated with the specification module 604 includes a value offset field for specifying an offset number that is added to the value for the computer 110 generated by the value-generating module 602. This offset number randomizes the starting point for deployment of software updates so that a different group of computers 110 is the first to receive a software update during each deployment. In other words, this field provides a mechanism to avoid having the same client 110 with the same value always being the first to receive distributions of software updates. Using this mechanism, the starting point within the population range of values is randomized so that different parts of the population range space are targeted to receive the first rollout of a new software update. Thus, the same group of initial values does not have to suffer to consequences of potentially problematic software updates over and over again. Instead, the first group to receive the new software update is determined randomly.

As one more specific example of this, client computer A has a value of 1, and in this example, updates are always first provided to the 20% of computers with the lowest values. Unless the client A's value is modified, it will always be in the first group of computers to receive the updates. However, if the value offset number specified in the update specification for computer A is 389455, this offset number would be added to the number 1 for computer A. Thus, computer A would have a new value of 389456 for that update release, and computer A may be less likely to fall within the first 20% to receive the update.

In some embodiments, the administrator provides the value offset number by entering in a value into the offset field each time a new update is released. In other embodiments, a random number generator for each computer 110 generates the offset number. In still other embodiments, a random number generator for the server 116 generates each offset number to be added to the values for computers 110.

In the above-described example, the update deployment specification also includes an update start time field for specifying a start time for deployment of the software update. This field permits specification of a start time that can be used as the origin base time from which all software update time windows are calculated. Thus, the update start time is the time at which the first software update will be released or made available for download. The administrator can set this field by entering in a desired start time for update deployment rollout. When that start time is reached, the rollout of the update over time to portions of the population range (as specified in the update deployment specification) will begin. For example, if a start time of Mar. 11, 2005, at 5 p.m. is provided, then on that date and at that time, the update deployment module 120 will begin release of the software update to the currently eligible specified portion of the population range.

As stated above, the specification module 604 can receive update information that specifies an eligibility window during which a specified portion of the population range is eligible to retrieve an update. Thus, the specification can include an eligibility window field into which the administrator can insert eligibility information. In the above-described example, each eligibility window can include a time window and specified portion. In other words, the update specification can include a time window field and a field for entering in the specified portion information. The time window field can specify lengths of time during which computers with values falling within the specified portion can retrieve the software update. Similarly, the specified portion field can specify portions of the population range to receive the update over time. In some embodiments, the specified portion is an incremental percentage that is specified in an incremental percentage field. In this field, the administrator can enter in incremental percentages of values within the population range to receive the software update. Thus, in these embodiments, the time window field specifies the length of a particular rollout distribution window during which a specified incremental percentage of the population range is allowed to retrieve the corresponding software update. Though the eligibility window does not have to include a time window and the specified portion in the eligibility window does not have to be an incremental percentage, both time windows and incremental percentages are used frequently herein as examples of how the eligibility windows can be defined.

Within the time window, it is possible to gradually roll out an update to computers 110 with values within the specified portion for a given time window. Spreading these allowance times over the time window can be done using various update rollout curves, such as a linear distribution within the window. Where a linear distribution is used, the slope of distribution can be equal to the size of the population range (i.e., the incremental percentage multiplied by the population range size) divided by the time window duration. The slope gives the rate at which values for computers 110 are added to the sample per time window unit (i.e., values added per second within the rollout time window if seconds are used as the rollout duration unit).

In addition, the eligibility window does not have to be defined by windows of time. In some embodiments, each eligibility window does not end at a particular time, but instead the window ends after all eligible computers (i.e., all computers 110 having values falling within the specified portion or incremental percentage associated with that window) have successfully downloaded the software update, or after a certain minimum percentage of computers 110 have downloaded the update. Thus, once a certain minimum percentage of computers having values falling within the specified incremental percentage have successfully retrieved the update, the percentage of eligible computers 110 is automatically increased (and this pattern can continue until all computers 110 are able to retrieve the update). Where time windows are used, the time windows can be specified in various types of increments (i.e., time increments, such as seconds, minutes, hours, days, weeks, months, or combinations thereof, etc.). In addition, the specified portion can be specified as a percentage, a fraction, a range of numbers, etc. For example, the specified portion can be represented as a percentage of the values in the population range (e.g., 20 percent) or a sampling range of values within the population range (i.e., where the population range equals 1 to 100,000, the sampling range can be 1 to 100).

As a more specific example of these eligibility windows, the update deployment specification could specify eligibility windows that include time windows of 1 day, 3 days and 7 days, and corresponding specified portions of 10%, 35% and 50%. Thus, during the first day, 10% of the population range (i.e., computers 110 having values falling within that 10%) will be permitted to retrieve the update. At day 3, 35% will be permitted to retrieve the update, and at day 7, 50% will be permitted to retrieve the update. The incremental percentages may be set in any number of ways. For example, the 10% can include the lowest 10% of the values for computers 110 (or the highest 10%, etc.), and the 35% includes the lowest 10% plus another 25% of the lowest values (or the 35% could define an extra 35% on top of the 10%, thus allowing a total of 45% of computers 110 with the lowest values to retrieve the update).

Rather than including a list of update fields, as described above, it is also possible to use a single function that fully describes the software update rollout to varying percentages of clients 110 over time. In addition, it is possible for multiple specifications to be overlaid to get more complex composite specifications and/or to create "holes" in the specifications. It is also possible to specify an update specification and a separate "blackout" specification that specifies windows during which no one is allowed to get the software updates (i.e., poke "holes" in the original specification). Other fields could also be included in the update specification, such as fields that specify a user's risk tolerance with regard to receiving of new software updates, etc., and the fields described above can be varied in any number of manners.

In some embodiments, the optional code selector, the value offset, and the update start time are specified only once, while the time window and incremental percentage can repeat as a pair, as necessary. The [time window, incremental percentage] pairs describe the specified portion or percentage of the population range that is given permission to retrieve the software update during the window of time specified for that portion or percentage.

There are many different types of specification syntax that can be used in the update specification. In one example, the specification syntax includes a name=value form where name is Specification. If the code selector is used, the specification syntax could be Specification_CC, where CC is the code selector (e.g., a country code, such as "US" for United States). In some embodiments, the "value" associated with the name=value syntax can be of the form:

value offset, update start time, time window, incremental percentage, time window, incremental percentage, etc.

A concrete example that specifies an update specification with the United States as the selected country is as follows:

Specification_US=38494242428, 2.8.2005 17:35:00, 604800, 20, 86400, 30

In the example above, the "United States" is selected in the country code selector field (e.g., "US"). The value offset specified in the value offset field is "38494242428." The update start time specified in the update start time field is "Feb. 8, 2005" at 17:35 (5 pm) GMT (e.g., "2.8.2005 17.35:00"). In the example above, two time windows for rollout of the software update are specified in seconds (e.g., "604800" and "86400"). There is also an incremental percentage or sampling range of values associated with each time window (e.g., "20" and "30"). Thus, the [time window, incremental percentage] pairs are "604800, 20, 86400, 30."

In the above example, the first rollout time window will last for 1 week, since there are 604,800 seconds in one week. During this one week window, 20 percent of the population range will be allowed to obtain the software update during that window (i.e., 20 percent of computers 110 with values within this 20 percent increment will be allowed to retrieve the software update during that time window). The subsequent rollout time window is set to last 1 day, since there are 86,400 seconds in 1 day. In other words, the second window adds another day to the 7 days (1 week) of the previous time window. During this second 1-day rollout time window, an additional 30 percent of computers 110 with values in the population range will be allowed to obtain the update (i.e., computers 110 with values falling within this additional 30 percent will be allowed to retrieve the update). By the end of the first week and 1 day, a total of 50 percent of the total population range of values associated with computers 110 has been allowed to obtain the software update. If the window specifications do not cumulatively cover 100 percent of the population range, then the remainder of the population range can be allowed to obtain the software update once all of the specified time windows have expired. Thus, in the example from above, the remaining 50 percent of the population range will be allowed to obtain updates after 1 week and 1 day.

In some embodiments, the time window for each incremental percentage does not remain open beyond the specified window. Contrary to the example above where the values falling within the first 20 percent increment can still retrieve the software update even after the 1-week time window, in these embodiments the 20 percent increment would no longer be able to download the update once the 1 week period ended. During the next day (86,400 seconds), another 10 percent increment would be able to retrieve the update, but the 1-day window would then close at the end of the day and the 10 percent of the values would no longer have access. This trend can continue with windows opening and closing during which subsets of users can download the update. In some embodiments, the entire population range (with no particular time limit) can be permitted to retrieve the update once the windows have all expired.

In some embodiments, each subsequent time window begins immediately following the previous rollout window. However, in some embodiments, there is a pause between one or more of the time windows. This pause can be useful, for example, in monitoring for problems with each window of update release, and the pause can provide time to react to the problem (i.e., sending out a patch, notifying users of the problem, removing the update from distribution, etc.).

In some embodiments, it is possible to specify time windows during which no additional portion of the population range is allowed to obtain the software update. This holds the software update release steady for some period at the cumulative percentage covered up to that point. An example of this would be a rollout time window specification of "604800, 0." In this example, the value "0" means 0 percent of the population range is to be added over the 1-week (604,800 second) window duration.

In some embodiments, it is also possible to specify windows of 0 length. In this example, a specified percentage of the population range is allowed to retrieve the software update all at once. An example of this would an eligibility window specification of "0, 50." In this example, an incremental 50 percent of the population range is immediately allowed to receive the software update as of the occurrence of the specified time window (which is dependent on where in the sequence of time window specifications this particular 50 percent specification occurs).

An eligibility determination module 606 applies rules to automatically determine eligibility of the computer to retrieve the software update. The computer is determined eligible when the value for the computer falls within the specified portion of the population range for the eligibility window. In some embodiments, the eligibility determination module 606 runs on the client computer 110, and so the client 110 itself determines when it is the appropriate time for the computer 110 to retrieve the update, according to the update deployment specification. For example, the client 110 can interpret the update deployment specification and make a determination regarding when its value falls within the incremental percentage and when the current time falls within the specified time window for the particular client computer 110 to download the update. In other embodiments, the eligibility determination module 606 runs on the server 116, and so the server 116 determines when the client is eligible to receive the update. The server 116 can make the update available to the particular client 110 at the appropriate time or can actually send the update to the client 110 at the appropriate time.

In embodiments where the client computer 110 uses the update specification to determine its eligibility to receive the update, the client computer 110 uses its country code or other type of code to select an appropriate specification from the update file. For example, the client computer 110 notes that it has a US country code, and then uses this to select the appropriate US-specific update specification for the software update. If there is no specific update specification for the country code, the client computer 110 uses the specification that does not include a country code.

As a more specific example, the client computer 110 determines when it is allowed to obtain an update by using a set of rules and using the update specification and computer's 110 value, as shown below. In this example, the value for the computer 110 is referred to as the "update ID," the value offset is referred to as the "update ID offset," the time window is referred to as "rollout window duration" and the eligibility window is referred to as a "rollout window." This is just one example of how the update deployment module 120 might work for the purpose of illustration, but the module 120 is not limited to using the rules described below and is not limited to functioning in the manner described below.

1. Temp ID=update ID+update ID offset (rollover through 0 when this exceeds max update ID)
2. Max ID=0
3. Window Start Time=update start time
4. For each rollout window:
   a. If current time (GMT)<Window Start Time then deny and exit
   b. Time Elapsed Since Window Start=current time (GMT)−Window Start Time
   c. IDs In Window=(max update ID*incremental percentage)
   d. IDs per Unit Time=rollout window duration?
      IDs In Window/(rollout window duration): 0
      (This can allow for a 0 rollout window duration which allows for a step-wise jump in allowed IDs at a given time)
   e. If Max ID>=max update ID−IDs per Unit Time*Time Elapsed Since Window Start then allow and exit (This can check if Current Max ID is about to exceed max update ID)
   f. Current Max ID=Max ID+IDs per Unit Time*Time Elapsed Since Window Start
   g. If Temp ID<=Current Max ID then allow and exit
   h. Window Start Time+=rollout window duration
   i. Max ID+=Ids In Window
5. If current time (GMT)>Window Start Time then allow (all specified windows have elapsed if the loop above has been exited from without allowing retrieval of the update)

Using the algorithm from the example above, the update ID or value is modified or randomized using the update ID offset (or value offset). It is then determined whether the current time is within one of the specified time windows. If so, the rate of IDs or values per unit time (as indicated by the duration and percentage specified for the current window) is multiplied by the current time offset into the current time window to dynamically determine the upper bound ID or upper bound value for the current time window. Finally, it is determined whether or not the update ID or value modified using the update ID offset or value offset falls below the calculated current upper bound ID. If so, the update is allowed and the computer can retrieve the update. If not, the update is not allowed.

This algorithm maps the update ID space or population range into the time space covered by the rollout time window specifications. In this example, 1 unit in update ID space is mapped into 1 second of update window time. Other mappings (e.g. non 1-to-1 ID to time units) are also possible. For example when using seconds as a unit for time window specifications, other durations can be mapped into seconds before use of the technique outlined above. The technique can also be scaled for other dimensions and units (i.e., use of real numbers instead of integers for update IDs or values, the use of time units other than seconds, etc.).

The update module 608 permits the computer 110 to retrieve the software update based on the eligibility determination. In some embodiments, after receiving notification from the eligibility determination module 606 that a computer 110 is eligible to receive an update, the update module 608 will make the update available to the computer 110 so the update can be downloaded by the user. In other embodiments, the update module 608 automatically downloads and installs those changes on the computer 110 if the user has configured the computer 110 to allow these automatic installations. In some embodiments, the update module 608 runs on the client computer 110, and thus the client 110 downloads the update for installation on the client 110. It is possible that the update was always available for download by the client 110, however the client 110 will not actually attempt to download the update until the client 110 is determined to be eligible or determines itself to be eligible. It is also possible that the update was not even available for download by the client 110 until the client is determined eligible. In other embodiments, the update module 608 runs on the server 116, which sends the update to the client computer 110 once the client 110 becomes eligible. In some embodiments, the eligibility determination module 606 only finds the computer 110 eligible to receive certain parts of the update. The user may only be permitted to download a particular portion of the update package (i.e., if it is determined that the user is running other software that may conflict with a portion of the update).

Figure 7:
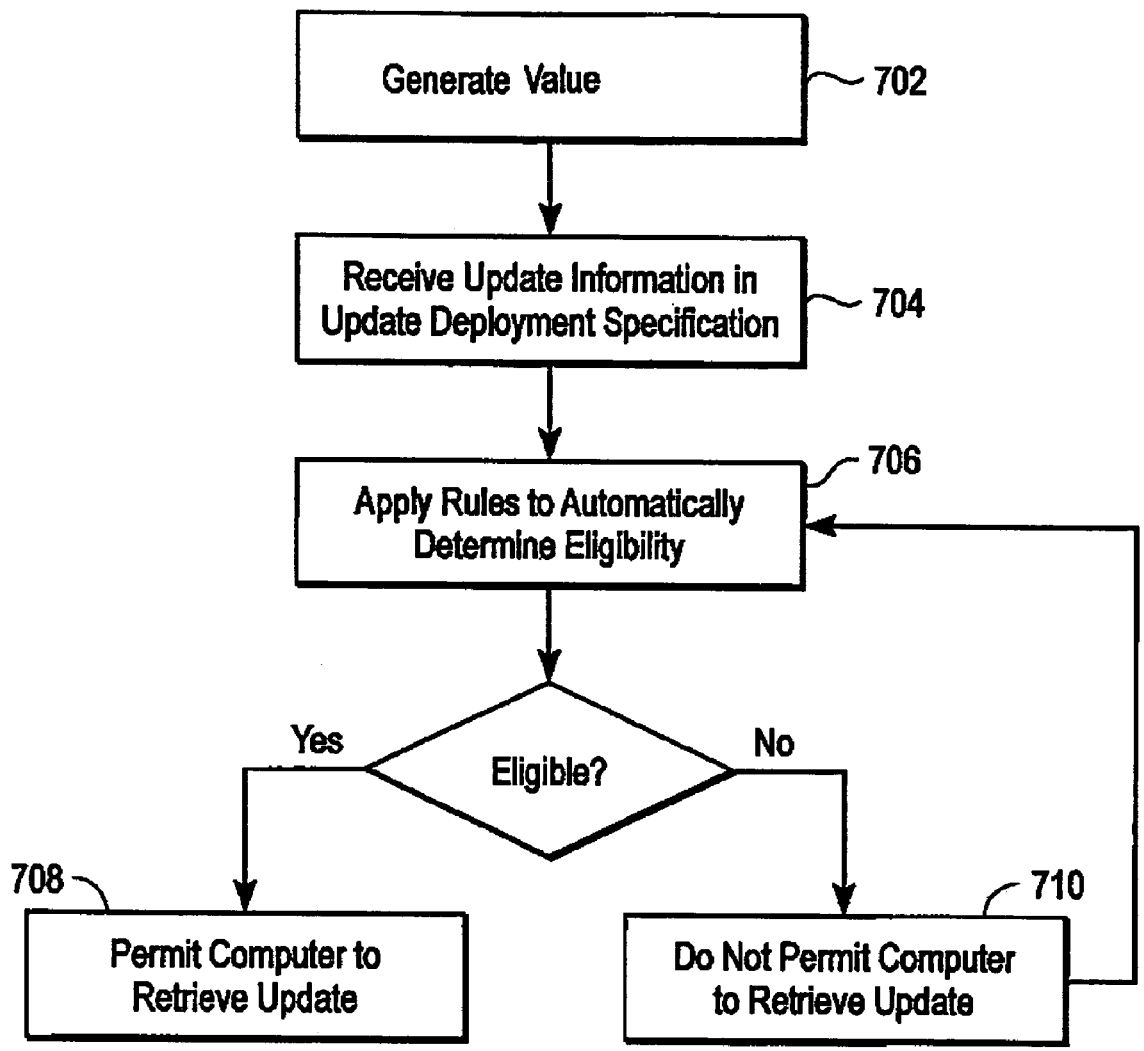
FIG. 7 is a flowchart illustrating steps performed to control the release of software updates, according to another embodiment of the present invention.

Referring now to FIG. 7, there is shown a flowchart illustrating the operation of the update deployment module 120, according to some embodiments of the present invention. It should be understood that these steps are illustrative only. Different embodiments of the update deployment module 120 may perform the illustrated steps in different orders, omit certain steps, and/or perform additional steps not shown in FIG. 7.

As shown in FIG. 7, the update deployment module 120 generates 702 a value for a computer. Each client computer 110 connected to a server 116 can generate a value, for example. This value generated will fall within a population range, and as described previously, the population range spans the set of values for all clients 110 to whom the update will probably ultimately be sent after the testing has been completed. The value generated can be non-unique (e.g., more than one client 110 can generate the same value), and can potentially be maintained until generation of a new number becomes necessary (e.g., system failure or user migration to a new machine).

The update deployment module 120 also receives 704 update information in an update deployment specification. As described above, the update information specifies eligibility windows during which specified portions of the population range are eligible to retrieve an update. The specification can include numerous fields, such as a code selector field, an update start time field, a value offset field, etc. through which parameters for automatic deployment of software updates can be set. In some embodiments, the specification includes a time window field and an incremental percentage field, which together allow the administrator to define one or more eligibility windows. Based on information included in the update deployment specification, the update deployment module 120 can automatically deploy a software update over time to portions of a user base.

The update deployment module 120 further applies 706 rules to determine whether a computer is eligible to receive the software update. A computer is eligible when the value for the computer falls within the specified portion of the population range for the eligibility window. For example, numerous eligibility windows can be defined by specifying percentages of the population range and associating each percentage with a window of time. In some embodiments, the percentages increase over the increasing windows of time. Computers 110 with values falling within the percentage for an eligibility window can retrieve the update. Thus, the administrator can control what portion of the user base automatically retrieves the update over set periods of time.

If the update deployment module 120 determines that the computer is eligible for receiving the update (i.e., the value for the computer falls within the specified portion of the population range for the eligibility window), the module 120 permits 708 the computer to retrieve the update. In some embodiments, the update is made available for retrieval, and in other embodiments, the update is sent to the computer 110. If the update deployment module 120 determines that the computer 110 is not or not yet eligible for receiving the update, the module 120 does not permit 710 the computer 110 to retrieve the update. In the example shown in FIG. 7, the client 110 can check again at a later time to see if it is eligible by again applying 706 the rules to determine eligibility. In some embodiments, the software update is downloaded by the computer 110 but not installed until the computer 110 is deemed eligible to receive the update.

Figure 8:
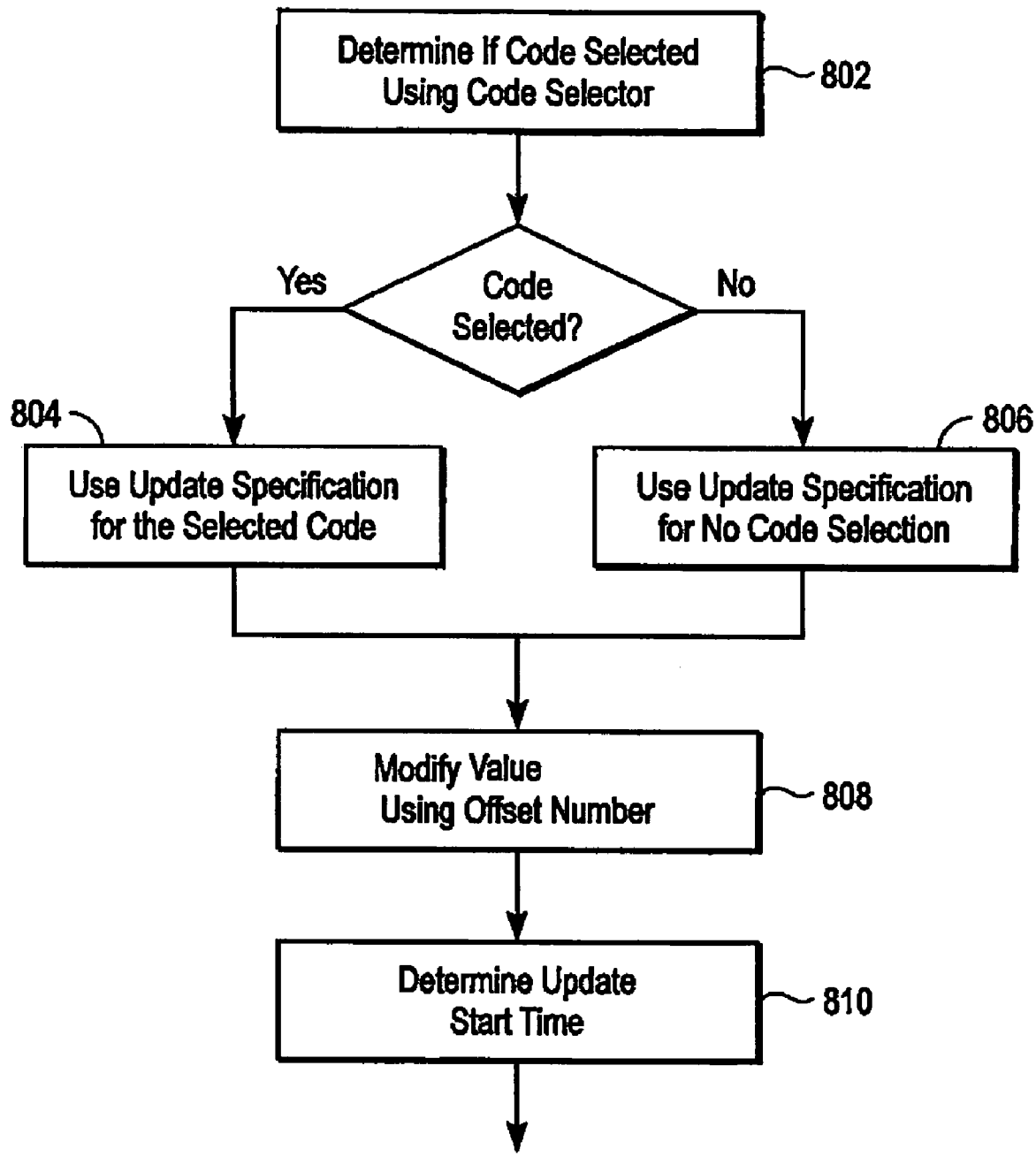
FIG. 8 is a flowchart illustrating an example of the steps performed to determine the eligibility of a computer to receive a software update, according to another embodiment of the present invention.

Referring now to FIG. 8, there is shown an example of an embodiment in which the rules are applied 706 to determine eligibility of the computer 110. This is just one example of how the update deployment module 129 might function, but the module 120 is not limited to functioning in this manner. In this example, the update deployment specification includes a code selector field, an update start time field, a value offset field, a time window field, and an incremental percentage field. In determining eligibility, the update deployment module first determines 802 if a code was selected using a code selector module. As explained above, in some embodiments, a country code or some other type of code can be selected for the update (i.e., the update deployment can be limited to users in France if a country code for France is selected). If a code is selected, the update deployment module 120 uses 804 the update deployment specification for the specific selected code. Thus, the module 120 selected a specification specific to France, so that the update deployment will occur only in France. If no code is selected, the module 120 uses 806 the update deployment specification for no code selection, which does not include a country code or other type of code (i.e., deployment will not be limited according to region).

The update deployment module 120 then modifies 808 the value using the value offset number, by adding the offset number to the value. In this manner, the order by which groups of computers 110 will receive the update is randomized (so no group is forced to continually be the first group receiving the update).

The update deployment module 120 also determines 810 the update start time. This start time can be specified in the update deployment specification, and the start time determines the time from which the various time windows will be calculated. If the current time is the update start time, the module 120 will begin automatic deployment of the update.

Figure 9:
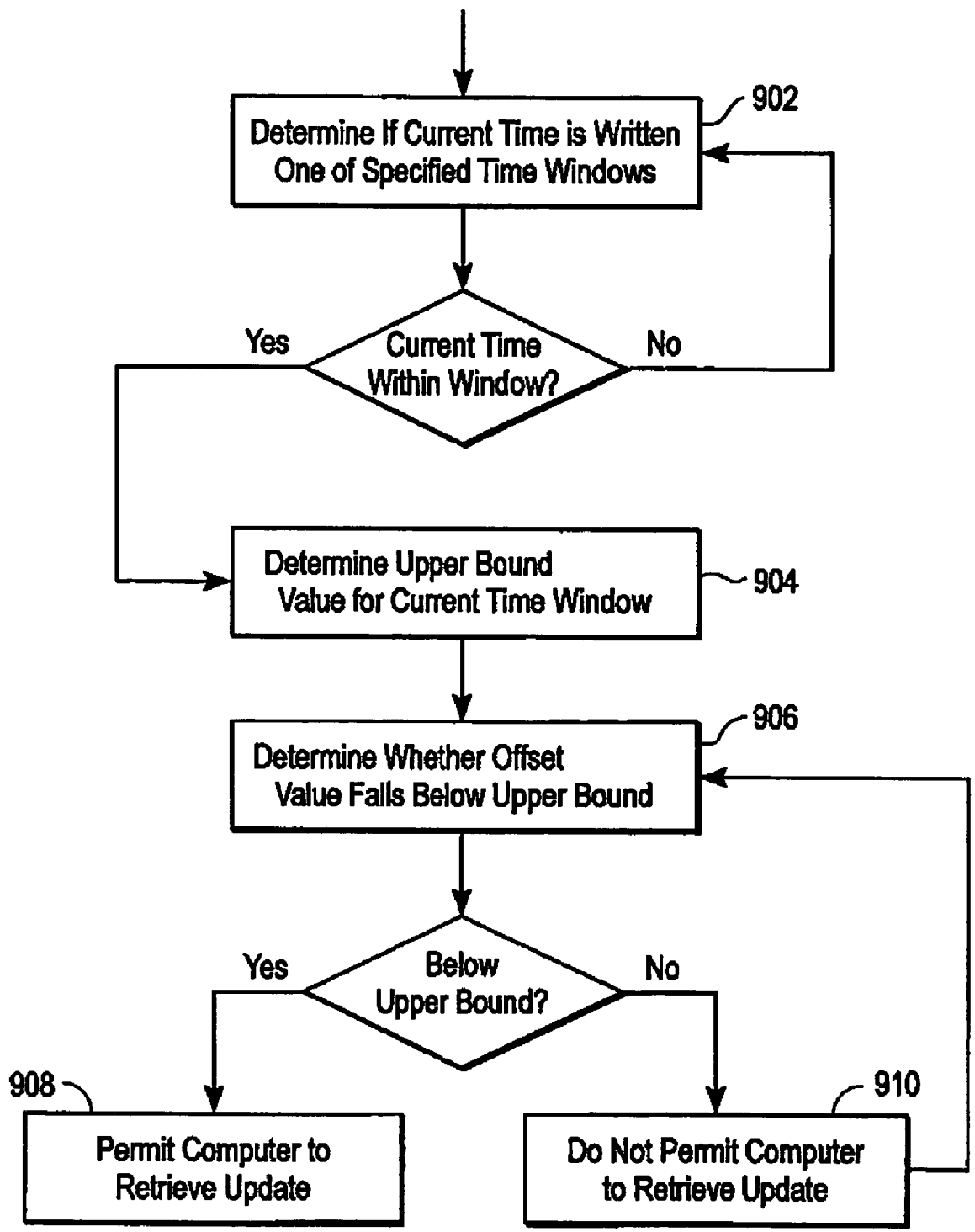
FIG. 9 is a flowchart illustrating an example of the steps performed to determine the eligibility of a computer to receive a software update, according to another embodiment of the present invention.

Referring now to FIG. 9, there is shown a continuation of the example of an embodiment in which the rules are applied 706 to determine eligibility of the computer 110. The update deployment module 120 determines 902 if the current time is within one of the time windows specified in the update deployment specification. If the current time is not within a window, the module 120 can check back at a later time to determine 902 again if the current time is within a window. If, however, the module 120 finds that the current time is within a window, the module will move ahead to determining 904 the upper bound of the values for the current time window. The module can use the rate of values per unit of time (as indicated by the time and the percentage specified for the current window) multiplied by the current time offset into the current window to dynamically determine the upper bound value for the current time window.

The update deployment module 120 then determines 906 whether the offset value (the value plus the offset number) falls below the upper bound value for the current time window. If it is below the upper bound, the module permits 908 the computer to retrieve the update. If it is not below the upper bound, the module 120 does not permit 910 the computer to retrieve the update. The module 120 can also check back later to determine if its value falls below the upper bound for the current time window.

Through these methods, the update deployment module 120 allows creation of a specification of parameters for automatic deployment of a software update to subsets of users over time. Once the parameters are defined, the update rollout proceeds automatically until a problem with an update is detected. Thus, risk of inadvertent introduction of software bugs through update releases can be greatly minimized.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A computer program product comprising a computer-readable storage medium having executable computer program logic embodied therein for executing on a computer system to controllably release software updates to a sample of computers with updateable software, the computer program logic comprising:
    a value-generating module for generating a value for a computer, the value falling within a population range of possible values, the population range spanning a set of values for each computer that will be retrieving the software update;
    a specification module for receiving update information in an update deployment specification, the information specifying an eligibility window during which a specified portion of the population range is eligible to retrieve a software update;
    an eligibility determination module for applying rules to automatically determine eligibility of the computer to retrieve the software update, the computer being determined eligible when the value for the computer falls within the specified portion of the population range for the eligibility window; and
    an update module for permitting the computer to retrieve the software update.

2. The computer program product of claim 1, wherein the value generated for the computer does not affect the probability of which value will be generated for a second computer.

3. The computer program product of claim 1, wherein the update deployment specification comprises a value offset field for specifying an offset number that is added to the value for the computer.

4. The computer program product of claim 3, wherein the offset number randomizes a starting point for deployment of software updates so that a different computer initially receives each software update during each deployment.

5. The computer program product of claim 1, wherein the update deployment specification comprises an update start time field for specifying a start time for deployment of the software update.

6. The computer program product of claim 1, wherein the specified portion is a percentage of the population range and the update deployment specification comprises an incremental percentage field for specifying incremental percentages of values within the population range to receive the software update.

7. The computer program product of claim 6, wherein the update deployment specification comprises a time window field for specifying lengths of time during which computers with values falling within the incremental percentages of values can retrieve the software update.

8. The computer program product of claim 1, wherein the computer being determined eligible when the value for the computer falls within the specified portion of the population range for the eligibility window further comprises the computer being determined eligible when current time is within a time window specified in the update deployment specification.

9. The computer program product of claim 8, wherein the computer being determined eligible when current time is within a time window specified in the update deployment specification further comprises the computer being determined eligible when the value for the computer falls below a calculated upper bound of values for computers eligible to receive the update for the time window, the upper bound being calculated based on the update information in the update deployment specification.

10. The computer program product of claim 1, wherein the update deployment specification comprises a code selector field for specifying a particular region in which automatic deployment of the software update will occur.

11. A method of controllably releasing software updates to a sample of computers with updateable software, the method comprising:
    generating a value for a computer, the value falling within a population range of possible values, the population range scanning a set of values for each computer that will be retrieving the software update;
    receiving update information in an update deployment specification, the information specifying an eligibility window during which a specified portion of the population range is eligible to retrieve a software update;
    applying rules to automatically determine eligibility of the computer to retrieve the software update, the computer being determined eligible when the value for the computer falls within the specified portion of the population range for the eligibility window; and
    permitting the computer to retrieve the software update based on the eligibility determination.

12. The method of claim 11, wherein receiving update information in an update deployment specification further comprises receiving a value offset number that is added to the value for the computer, the offset number randomizing a starting point for deployment of software updates so that a different computer initially receives each software update during each deployment.

13. The method of claim 11, wherein receiving update information in an update deployment specification further comprises receiving a start time for deployment of the software update.

14. The method of claim 11, wherein the specified portion is a percentage of the population range and wherein receiving update information in an update deployment specification further comprises receiving incremental percentages of values within the population range to retrieve the software update.

15. The method of claim 14, wherein receiving update information in an update deployment specification further comprises receiving time windows during which computers with values falling within the incremental percentages of values can retrieve the software update.

16. The method of claim 11, wherein the computer being determined eligible when the value for the computer falls within the specified portion of the population range for the eligibility window further comprises the computer being determined eligible when current time is within a time window specified in the update deployment specification.

17. The method of claim 16, wherein the computer being determined eligible when current time is within a time window specified in the update deployment specification further comprises the computer being determined eligible when the value for the computer falls within an incremental percentage of computers eligible to receive the update for the time window.

18. The method of claim 11, further comprising automatically increasing the specified portion over specified time windows according to the update deployment specification to increase percentage of computers eligible to receive the update over time.

19. The method of claim 11, further comprising:
determining that the value for the computer falls within the specified portion for a current time window; and
permitting the computer to retrieve the update.

20. The method of claim 11, wherein receiving update information in an update deployment specification further comprises receiving a regional code selection specifying a particular region in which automatic deployment of the software update will occur.

21. A system for controllably releasing software updates to a sample of computers with updateable software, the system comprising:
a value-generating module for generating a value for a computer, the value falling within a population range of possible values, the population range scanning a set of values for each computer that will be retrieving the software update;
a specification module for receiving update information in an update deployment specification, the information specifying an eligibility window during which a specified portion of the population range is eligible to retrieve a software update;
an eligibility determination module for applying rules to automatically determine eligibility of the computer to retrieve the software update, the computer being determined eligible when the value for the computer falls within the specified portion of the population range for the eligibility window; and
an update module for permitting the computer to retrieve the software update based on the eligibility determination.

22. The system of claim 21, wherein the update deployment specification comprises a value offset field for specifying an offset number that is added to the value for the computer, the offset number randomizing a starting point for deployment of software updates so that a different computer initially receives each software update during each deployment.

23. The system of claim 21, wherein the update deployment specification comprises an update start time field for specifying a start time for deployment of the software update.

24. The system of claim 23, wherein the update deployment specification comprises a time window field for specifying windows of time during which computers with values falling within specified portions of the population range can retrieve the software update.

25. The system of claim 24, wherein the windows of time are calculated starting from the start time.

26. The system of claim 21, wherein the update deployment specification comprises an incremental percentage field for specifying incremental percentages of values within the population range to receive the software update.

27. The system of claim 21, wherein the eligibility determination module determines the computer eligible when the current time falls within a time window specified in the update deployment specification and the value for the computer falls within a specified percentage of the population range for the time window.

28. The system of claim 21, wherein the specified portion automatically increases over time windows according to the update deployment specification thereby increasing percentage of computers eligible to receive the update over time.

29. The system of claim 21, wherein the eligibility determination is conducted on an entity selected from the group consisting of: a client computer and a server.

* * * * *

UNITED STATES PATENT AND TRADEMARK OFFICE
CERTIFICATE OF CORRECTION

PATENT NO. : 7,555,551 B1
APPLICATION NO. : 11/216438
DATED : June 30, 2009
INVENTOR(S) : Bruce McCorkendale et al.

It is certified that error appears in the above-identified patent and that said Letters Patent is hereby corrected as shown below:

In claim 11, Column 24, Line 43, replace "scanning" with --spanning--, and

In claim 21, Column 25, Line 44, replace "scanning" with --spanning--.

Signed and Sealed this

Eighth Day of September, 2009

David J. Kappos
*Director of the United States Patent and Trademark Office*